United States Patent [19]

Takano

[11] 4,403,683

[45] Sep. 13, 1983

[54] ELECTRO-MAGNETIC POWDER CLUTCH SYSTEM FOR AUTOMOBILES

[75] Inventor: Toshio Takano, Hamuramachi, Japan

[73] Assignee: Fuji Jukogyo Kabushiki Kaisha, Tokyo, Japan

[21] Appl. No.: 195,897

[22] Filed: Oct. 14, 1980

[30] Foreign Application Priority Data

Oct. 22, 1979 [JP] Japan ................................ 54-136560

[51] Int. Cl.³ .................... F16D 37/02; B60K 41/02; B60K 41/28
[52] U.S. Cl. ............................. 192/0.052; 192/0.075; 192/21.5; 192/30 W; 192/84 R
[58] Field of Search .................. 192/21.5, 84 R, 84 E, 192/0.052, 0.075, 82 T, 30 W; 310/94, 99

[56] References Cited

U.S. PATENT DOCUMENTS

| | | | |
|---|---|---|---|
| 2,688,388 | 9/1954 | Gill | 192/21.5 X |
| 2,990,927 | 7/1961 | Steadman | 192/0.052 X |
| 3,073,422 | 1/1963 | Baumann | 192/0.052 |
| 3,239,038 | 3/1966 | Peras | 192/0.052 X |

FOREIGN PATENT DOCUMENTS

| | | | |
|---|---|---|---|
| 955602 | 4/1964 | United Kingdom | 192/21.5 |
| 999643 | 7/1965 | United Kingdom | 192/84 R |

*Primary Examiner*—Rodney H. Bonck
*Attorney, Agent, or Firm*—Martin A. Farber

[57] ABSTRACT

A system for controlling an electro-magnetic powder clutch of an internal combustion engine for a vehicle comprises a transmission, a 2nd switch adapted to be closed in the 2nd speed stage of the transmission, a thermo switch adapted to be closed at a predetermined temperature of the clutch, and a control circuit. The control circuit is so arranged that the current to the magnetizing coil of the clutch increases with an increase of the rotational speed of the engine and that when the 2nd switch and the thermal switch are closed, the current in the 2nd speed stage steeply increases so as to be impossible to start the vehicle in the 2nd speed.

7 Claims, 4 Drawing Figures

ELECTRO-MAGNETIC POWDER CLUTCH SYSTEM FOR AUTOMOBILES

BACKGROUND OF THE INVENTION

The present invention relates to a system for preventing trouble caused by overheating of an electro-magnetic powder clutch for automobiles.

An electro-magnetic powder clutch is used for coupling a crankshaft of an engine with an input shaft of a transmission. Such electro-magnetic clutch are disclosed, for example, in U.S. Pat. Nos. 3,073,422 and 3,239,038. The electro-magnetic powder clutch comprises an annular drive member secured to the crankshaft of the engine, a magnetizing coil provided in the drive member, a driven member secured to the input shaft of the transmission and spaced from the drive member, and powder provided in the clutch. When the first gear or second gear is selected and the accelerator pedal is depressed, electric current flows through the magnetizing coil to magnetize the drive member. The powder is aggregated in the gap by the magnetic flux, so that the driven member is coupled member through the powder. Thus, the output of the engine may be transmitted to the transmission.

The clutch current in the magnetizing coil progressively increases depending upon the degree of depression of the accelerator pedal, while the clutch slips between the drive member and the driven member. Thus, the vehicle may be smoothly and easily started by depressing the accelerator pedal without operating a clutch pedal. The clutch slips continuously until the clutch torque reaches a value equal to the engine torque, namely, the stall torque. Stall speed at the stall torque in each transmission gear speed depends on the rotational speed of the engine. If the vehicle is started in the high speed stage such as 3rd or 4th speed, the clutch slips over a wide range as the engine speed increases to a high speed. As a result, the temperature of the clutch is excessively raised, which causes trouble by overheating of the clutch.

In order to prevent such overheating, conventionally, the clutch is so arranged that if the vehicle is started in 3rd and 4th speeds, the clutch increases so that the clutch is suddenly connected before the engine torque reaches a sufficient value in order to be able to drive the transmission load. Thus, the vehicle cannot be started due to the development of jolts or stalling of the engine.

On the other hand, the clutch is so arranged to permit a 2nd speed start in order to simplify the starting operation. However, if the 2nd speed start is repeated in particular circumstances such as in a traffic jam, the clutch is overheated by the slipping so that the insulation for the coil burns. Further, the grease in the bearings in the clutch is softened by the overheating so that the grease leaks therefrom, thereby decreasing the durability of the bearings. In addition, the grease enters the powder chamber of the clutch, promoting slipping of the clutch thereby causing damage on the clutch.

SUMMARY OF THE INVENTION

The object of the present invention is to provide an electro-magnetic powder clutch system of the type which permits starting in the 2nd speed gear position of the vehicle, and which can prevent trouble with the clutch through overheating due to frequent use of 2nd speed starting.

The present invention provides a system for controlling an electro-magnetic powder clutch of an internal combustion engine for a vehicle, which has a drive member secured to a crankshaft of said internal combustion engine, a magnetizing coil provided in said drive member, a driven member adjacent said drive member, and powered magnetic material disposed in a chamber between said drive member and said driven member, comprising a transmission secured to said driven member having multi-stage change gears including at least 1st, 2nd and 3rd speed stages, a 2nd switch adapted to be operated in the 2nd speed stage of said transmission, a 3rd switch adapted to be operated in the 3rd speed stage, a thermo switch adapted to be operated at a predetermined temperature of the clutch, and means for controlling the current to the magnetizing coil, the means being so arranged that the current increases with an increase of the rotational speed of the engine and the current in the 3rd speed stage more steeply increases than the current in the 2nd speed stage, and that when the 2nd switch and the thermo switch are operated, the current is varied as in the 3rd speed stage so as to be impossible to start the vehicle.

Other objects and advantages of the present invention will be apparent from the following description with reference to the accompanying drawings.

DESCRIPTION OF THE PREFERRED EMBODIMENT

Figure 1:
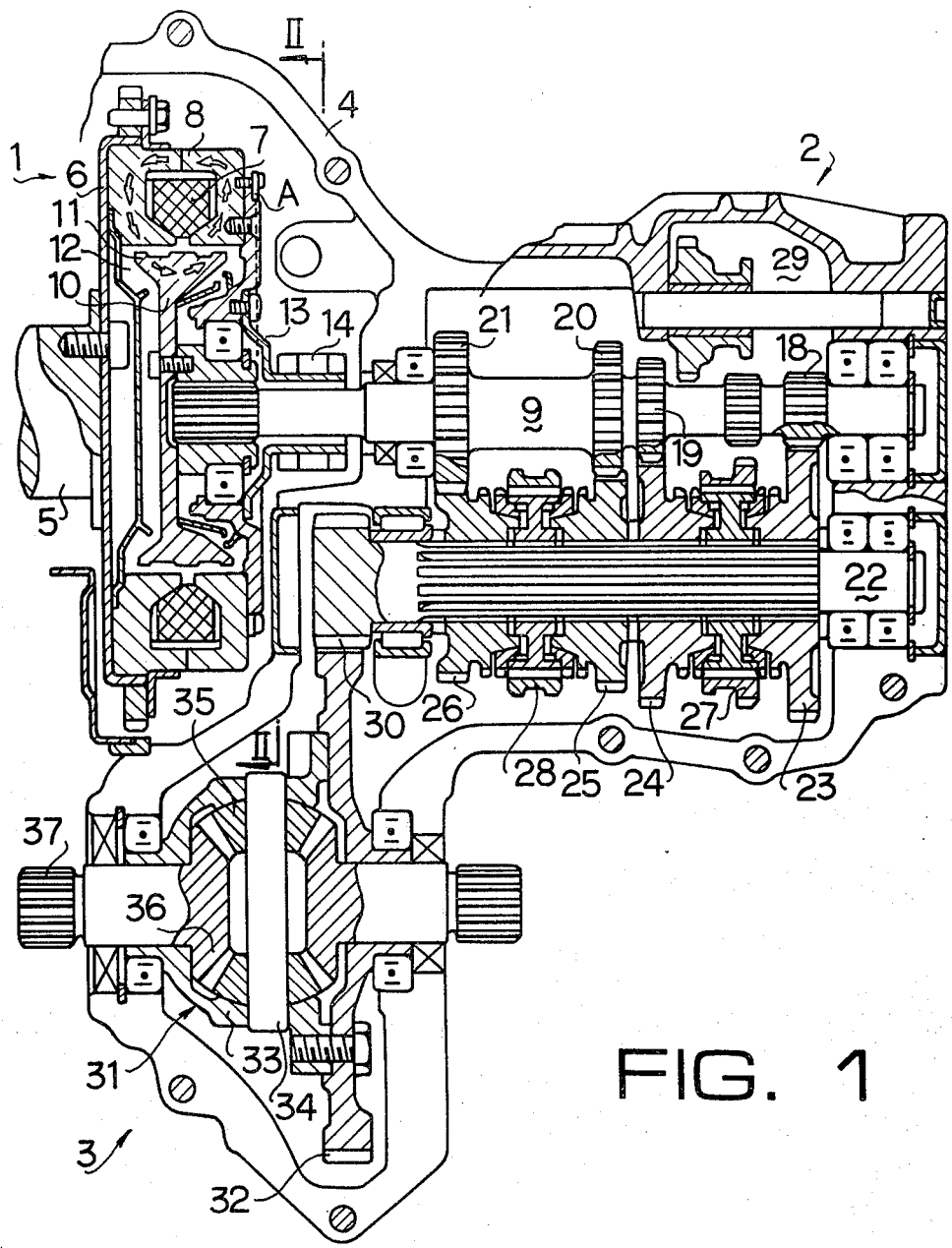
FIG. 1 is a sectional view of a transmission with an electro-magnetic clutch with transmission portion used in a system according to the present invention.
Figure 2:
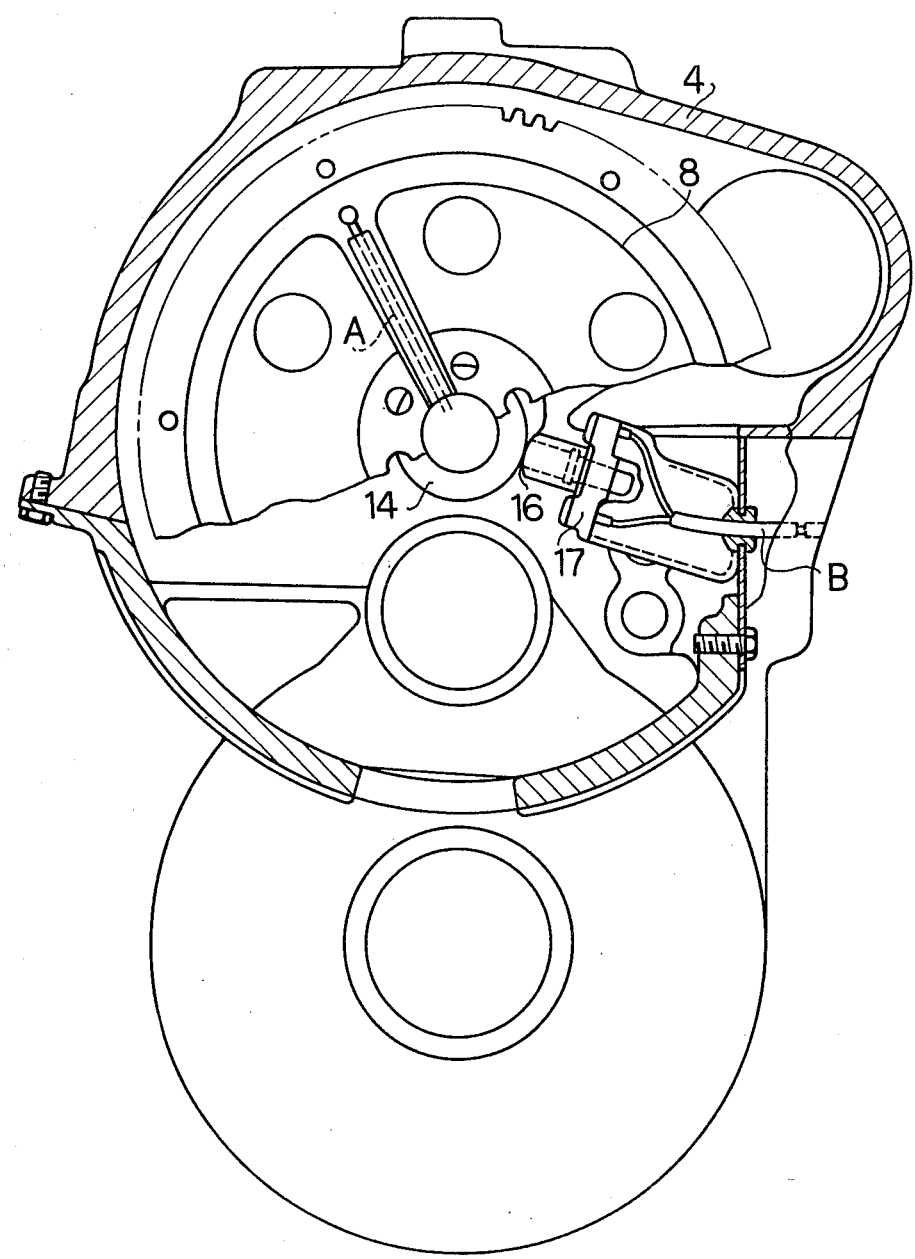
FIG. 2 is a sectional view taken along the line II—II in FIG. 1.

Referring to FIGS. 1 and 2 showing a transmission of the trans-axle type to which the present invention is applied, an electro-magnetic powder clutch 1 operatively connected to a four-speed transmission which drives a final reduction device 3. The electro-magnetic powder clutch 1 is provided in a clutch case 4 and comprises a drive plate 6 attached to the end of a crankshaft 5 of an engine, an annular drive member 8 secured to the drive plate 6, a magnetizing coil 7 provided in the drive member 8, and a driven member 10 secured by a spline engagement to an input shaft 9 of the transmission 2, spaced from and leaving a gap 11 relative to the drive member 8. Powered magnetic material is provided in a powder chamber 12, the gap 11 being adapted to be filled with the powder. A cap 13 is secured to the drive member 8. The cap 13 has a cylindrical portion coaxial with the input shaft 9, on which a slip ring 14 is secured. The slip ring 14 is connected to the drive member 8 by a lead A. A brush 16 pressed against the slip ring 14 is supported in a holder 17 and connected to a hereinafter described control means by a lead B.

When the drive member 8 is rotated through the drive plate 6 and crankshaft 5, the powder in the powder chamber 12 is directed into the gap 11 by the centrifugal force. If the magnetizing coil 7 is excited by the current applied through the lead B, the brush 16, the slip ring 14 and the lead A, the drive member 8 is magnetized to produce a magnetic flux passing through the driven member 10 as shown by arrows in FIG. 1. Thus the powder aggregates in the gap 11, so that the power of the engine is transmitted to the input shaft 9 through the clutch.

Figure 3:
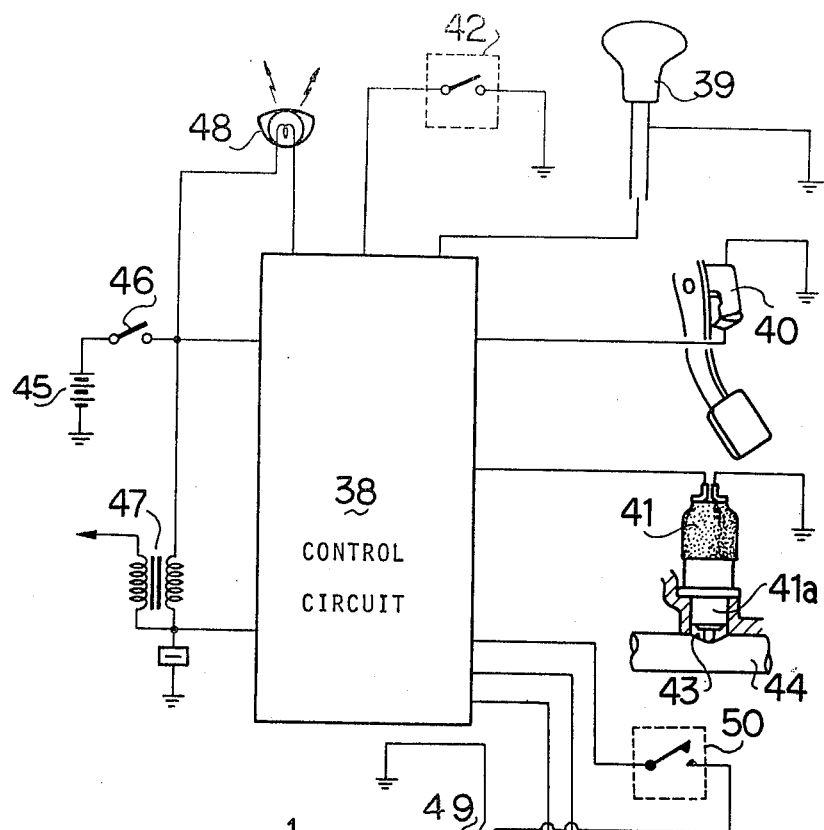
FIG. 3 is a graph showing a relation between rotational engine speed and engine torque and clutch current and torque.
Figure 3:
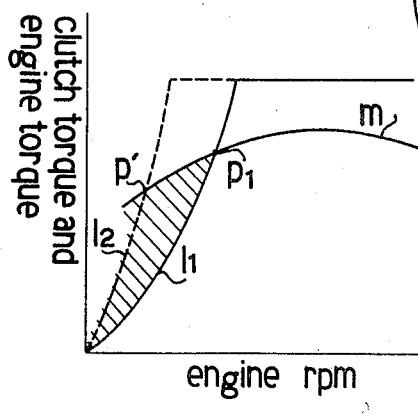

The system is so arranged as is well known per se that the current applied to the coil 7 increases with an increase in the rotational speed of the engine, so that the clutch current and torque increase as shown in FIG. 3. The clutch torque in the 1st speed and 2nd speed of the transmission is varied as shown by the line "$1_1$" so as to obtain a smooth starting of the vehicle. The clutch torque characteristics in the 3rd and 4th speeds steeply increase as shown by the line "$1_2$" as disclosed in U.S. Pat. No. 3,239,038. Both lines "$1_1$" and "$1_2$" cross the engine torque line "m" at "$P_1$" and "P" respectively. The clutch slips in the hatched range indicating that the clutch torque is less than the driving engine torque since the clutch slips. In the 3rd and 4th speeds, the clutch is coupled at a low engine torque "P'" before reaching an engine torque value sufficient to drive the transmission. Therefore, it is impossible to start the vehicle in the 3rd and 4th speeds of the transmission because the engine would stall since the engine suddenly would have to carry a large load.

In the transmission 2, 1st speed to 4th speed drive gears 18 to 21 are integrally mounted on the input shaft 9, which are engaged with driven gears 23 to 26 respectively. Driven gears 23 to 26 are rotatably mounted on the output shaft 22 which is parallel to the input shaft 9. Each of driven gears 23 and 24 is adapted to be engaged with the output shaft 22 by operating a synchromesh mechanism 27 and each of the driven gears 25 and 26 is engaged with the output shaft by a synchromesh mechanism 28 in a well known manner. Further a rear drive gear means 29 is provided which is selectively engaged with a rear drive gear.

An output gear 30 is secured to an end of the output shaft 22 and engages with a ring gear 32 of a differential 31 in the final reduction device 3. Thus, the output of the output shaft 22 is transmitted to an axle 37 through the ring gear 32, case 33, shaft 34, pinions 35 and slide gear 36 to drive the wheels (not shown).

Figure 4:
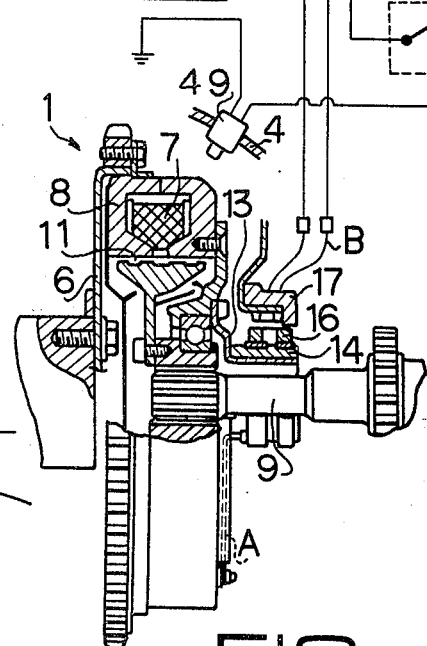
FIG. 4 shows an example of the system of the present invention.

FIG. 4 shows a control system of the above described clutch. The control system comprises a control circuit 38 and means for detecting the driving condition of the automobile. The control circuit 38 is designed in a well known manner to produce clutch functions vs. engine rpm in respective gear shift positions as shown in FIG. 3. The means for detecting the driving condition comprises a change lever switch 39 operated by operating the gear shift lever of the transmission, an accelerator switch 40 closed by depressing the accelerator pedal, a 3rd-4th switch 41 closed in the 3rd and 4th speed stages of the transmission, and a speed sensor 42. The 3rd-4th switch 41 comprises an actuating rod 41a pressed against a 3rd-4th shifter rail 44 by a spring (not shown). In the 3rd and 4th speeds, the 3rd-4th switch is closed by the rod 41a. In the neutral position, the actuating rod 41a engages in a recess 43 formed in the shifter rail 44, so that the 3rd-4th switch is opened. The speed sensor 42 is adapted to be closed, when the speed of the automobile exceeds a predetermined value. The source voltage of the battery 45 is applied to the coil 7 through the key switch 46 and the control circuit 38. The control circuit 38 is so arranged as to vary the current to the coil 7 as shown by the line "$1_1$" or "$1_2$" in FIG. 3 in accordance with the pulse from the ignition coil 47.

In accordance with the invention, a thermo switch 49 adapted to be closed at a predetermined temperature is provided on the clutch case 4 for detecting the temperature of the clutch. A second switch 50 adapted to be closed by shifting gears in the transmission to the 2nd speed stage is connected to the thermo switch 49 in series. The control circuit 38 is provided with a changing means, as per se is known for changing the clutch torque characteristic "$1_1$" to "$1_2$". However in accordance with the invention the circuit of the 2nd switch 50 and the thermo switch 49 is connected to this changing means and to a warning buzzer 48 for operation when both switches are closed. The 3rd-4th switch 41 is also connected to this means for operation.

In operation, when the accelerator switch 40 is closed, the control circuit 38 operates to apply the output voltage of the battery 45 to the magnetizing coil 7 of the clutch. When the automobile is started in the 1st speed, the clutch torque varies as the curve "$1_1$" in FIG. 3, whereby the vehicle starts smoothly. In 2nd speed starting, if the temperature of the clutch is low and the thermo switch 49 is opened, closing of the 2nd switch 50 does not cause the changing means in the control circuit 38 to change the clutch function to curve $1_2$. Thus, the automobile may be started by the clutch torque of the curve "$1_1$" as the start in the 1st speed. If the transmission is changed into the 3rd or 4th speed, the 3rd-4th switch is closed, so that the changing means is operated and the clutch torque varies as the line "$1_2$".

Thus, it is impossible to start the vehicle in the 3rd or 4th speed for the reasons mentioned above, and such a condition is signalled by a warning buzzer 48.

If the automobile is frequently started in the 2nd speed and the temperature of the clutch rises to a predetermined level, the thermo switch 49 is closed. Therefore, when the 2nd switch 50 is closed by operating the gear shift lever, changing means in the control circuit 38 operates to produce the clutch current or torque of the line "$1_2$". It makes it impossible to start the vehicle in the 2nd speed for the reasons mentioned above. At that time, the warning buzzer 48 also operates.

Thus, the driver shifts to first speed and the automobile may be started in the 1st speed and trouble through overheating of the clutch can be prevented.

It will be understood that the present invention provides an electro-magnetic powder clutch which is prevented from trouble caused by overheating as a result of frequent use of 2nd speed starting.

As used herein the terms "1st speed", "2nd speed", "3rd speed", or "2nd speed stage" etc. mean the corresponding gear position of normal operation in the respective speeds.

What is claimed is:

1. In a system for controlling an electro-magnetic clutch of an internal combustion engine for a vehicle, which has a drive member secured to a crankshaft of said internal combustion engine, a magnetizing coil provided in said drive member, and a driven member adjacent said drive member operatively connected to said drive member, and a transmission operatively connected to said driven member and having multi-stage change gears including at least first, second and third speed stages, the improvement comprising a 2nd gear switch means for being operated by shifting the gears in said transmission to the second speed stage a thermo switch means for being operated at a predetermined temperature of the clutch and connected to said 2nd gear switch means in series, and a warning means operatively connected to said 2nd gear switch means and said thermo switch means for being operated by a combination signal from said 2nd gear switch means and said thermo switch means.

2. The system according to claim 1 wherein said 2nd gear switch means is closed in the second speed stage and said thermo switch means is closed at said predetermined temperature of the clutch and when said switches are closed together providing said signal for operating said warning means.

3. The system as set forth in claim 1 or 2, wherein said clutch is a powder clutch having powdered magnetic material in said drive member, a control means for providing magnetizing current through said magnetizing coil as a first, and respectively, a second function of engine rpm during at least said second speed stage, and respectively, said third speed stage, said second function having a steeper magnetizing current increase with respect to the engine rpm than said first function, said warning means constitutes, said 2nd gear switch means and said thermo switch means when both are operated for causing said control means to switch to provide the current through said magnetizing coil as said second function of the engine rpm.

4. The system as set forth in claim 3, wherein said first function is also provided by said control means in the first speed stage.

5. The system as set forth in claim 1, wherein said warning means constitutes a sensory device.

6. The system as set forth in claim 1, wherein said warning means constitutes a sensory device and means for making ordinary starting in the second gear speed impossible.

7. The system as set forth in claim 1, 2 or 3, wherein said 2nd gear switch means and said thermo switch means are connected in series and said combination signal is from said series connection.

* * * * *